United States Patent
Yoshida et al.

(10) Patent No.: US 6,960,893 B2
(45) Date of Patent: Nov. 1, 2005

(54) DRIVING APPARATUS OF A LINEAR MOTOR

(75) Inventors: Makoto Yoshida, Kusatsu (JP); Mitsuo Ueda, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 331 days.

(21) Appl. No.: 10/441,074

(22) Filed: May 20, 2003

(65) Prior Publication Data

US 2004/0005222 A1    Jan. 8, 2004

(30) Foreign Application Priority Data

May 21, 2002  (JP) .............................. 2002-146391

(51) Int. Cl.[7] ............................................ H02K 33/00
(52) U.S. Cl. ....................... 318/127; 318/135; 318/811; 318/119; 417/44.11; 417/44.1; 417/417
(58) Field of Search ........................ 318/119, 126–128, 318/135, 811, 812; 417/44.1, 417, 44.11, 417/45; 363/41

(56) References Cited

U.S. PATENT DOCUMENTS 6,809,434 B1 * 10/2004 Duncan et al. ................ 310/12
6,851,934 B2 *  2/2005 Yoo et al. ................. 417/44.11

FOREIGN PATENT DOCUMENTS

JP        10-26083       1/1998   .......... F04B 49/06

* cited by examiner

Primary Examiner—Darren Schuberg
Assistant Examiner—Judson H. Jones
(74) Attorney, Agent, or Firm—Wenderoth, Lind & Ponack, L.L.P.

(57) ABSTRACT

A driving apparatus of a linear motor which reciprocally drives a movable element supported by an elastic member, includes an inverter that converts a direct current power into an alternating-current power with a specified frequency to drive the linear motor, a current detector that detects the output current of the inverter, a voltage detector that detects the output voltage of the inverter, an amplitude detector that detects an amplitude of the movable element of the linear motor, an amplitude controller adjusts the output current or output voltage in a first control cycle so that the amplitude of the movable element is a desired constant value, and a resonant controller that adjusts the output frequency of the inverter in a second control cycle which is larger than the first control cycle so that the output current of the inverter is substantially minimum on condition that the amplitude is substantially constant.

22 Claims, 13 Drawing Sheets

DRIVING APPARATUS OF A LINEAR MOTOR

BACKGROUND OF THE INVENTION

1. Technical Field of the Invention

The present invention relates to a driving apparatus of a resonance type linear motor for driving a movable element supported by an elastic member using a reciprocal motor (linear motor).

2. Related Art

Hitherto, as the device using a resonance type linear motor, for example, a linear compressor for air conditioner is known. The linear compressor is designed to generate compressed gas, by making use of a mechanical elastic member or elasticity of compressed gas and linear motor.

Referring to FIG. 13, a structure of linear compressor using a spring as elastic member is detailed. A piston 61 is movably supported on a cylinder 60 along its axial direction. A magnet 62 is fixed to the piston 61. A stator coil 64 buried in an outer yoke 63 is disposed at a position facing the magnet 62. A compression chamber 65 formed of the cylinder 60 and piston 61 is connected to a suction pipe 66 and a discharge pipe 67. The suction pipe 66 has a suction valve 68, and the discharge pipe 67 has a discharge valve 69. The piston 61 is elastically supported by a resonant spring 70. In FIG. 13, providing a sinusoidal current flowing in a linear motor section 71 including the outer yoke 63, stator coil 64 and magnet 62 by way of a motor driver (not shown) moves the piston 61 reciprocally in its axial direction. Thus thee refrigerant is sucked and compressed in the compression chamber 65.

To operate such a linear compressor at high efficiency, it is required to drive it by matching the resonant frequency of the linear compressor with the frequency of the input current into the linear motor section 71. The resonant frequency of the linear compressor is determined, in the case of a structure including an elastic member, based on the elastic member as a mechanical member (machine spring), the elasticity generated by compressed gas (gas spring), and the mass of the piston 61. However, the elasticity caused by compressed gas varies significantly depending on load fluctuations, and thus the resonant frequency of the linear compressor cannot be determined uniquely. Accordingly, making use of the phenomenon that a resonant state takes place when the input current and the piston speed are equal in phase, it has been proposed to calculate the varying resonant frequency (Japanese Laid-open Patent Publication No. 10-26083).

An example of such a method is explained briefly by referring to a flowchart shown in FIG. 14. At step S20, a sinusoidal current command value Iref to be entered in the linear compressor is created from a driving frequency f. At step S21, a present speed Vnow of the piston 61 is determined from the position information of the piston 61 transmitted from a position sensor provided in the linear compressor. At step S22, a phase difference of Iref and Vnow is determined, and the process goes to step S23 when Iref is advanced, to step S24 when both phases are equal, or step S25 when Iref is delayed. At step S23, since the present driving frequency is lower than the resonant frequency, the driving frequency f is increased and the process returns to step S20. At step S24, since the present driving frequency is equal to the resonant frequency, the driving frequency f is not changed and the process returns to step S20. At step S25, since the present driving frequency is higher than the resonant frequency, the driving frequency f is decreased and the process returns to step S20. In this way, the driving frequency is controlled to coincide with the resonant frequency, by using the position information of the piston 61 obtained by the position sensor.

However, such a control method of the resonant frequency has the following problems.

Firstly, in the process of the driving frequency nearing the resonant frequency, the amplitude of the piston (movable element) increases largely, and in a compressor of a large resonance factor, collision of piston and cylinder head may occur, or the refrigerating capacity of the compressor may fluctuate significantly. In particular, in an environment of vibration applied from outside of a vehicle or the like, the amplitude of the piston resonates at its resonant frequency, and such problem occurs.

Secondly, in this method, displacement of the piston in the cylinder must be measured, and therefore a displacement sensor must be incorporated in the linear compressor, and the volume and weight of the compressor are increased by the portion of the sensor. Still more, to calculate the speed by differentiating the signal from the displacement sensor, or to calculate the phase difference of speed and current, a relative complicated control device such as microcomputer or MPU (microprocessing unit) is needed, and thus the cost is increased.

Thirdly, when using the displacement sensor, the displacement sensor must be sealed in a shell of the linear compressor. Thus it is required to guarantee the operation reliability of the displacement sensor in severe working conditions including temperature, pressure, and refrigerant-resistance.

SUMMARY OF THE INVENTION

The present invention is directed to solve these problems, and it is hence an object thereof to present a linear motor and its driving apparatus of small size, light weight, low cost, and high reliability, not using a displacement sensor, capable of preventing collision of movable element (piston in the prior art) and a main body of the motor (compressor cylinder in the prior art) due to the resonant control process of the linear motor or external vibration, or fluctuations of motor performance.

To solve the above problems, the linear motor driving apparatus according to the present invention has the following configuration and operation.

The first driving apparatus according to the present invention is a driving apparatus of a linear motor which reciprocally drives a movable element supported by an elastic member, and includes the following components. An inverter converts a direct current power into an alternating-current power with a specified frequency to drive the linear motor. A current detector detects the output current of the inverter. A voltage detector detects the output voltage of the inverter. An amplitude detector detects an amplitude of the movable element of the linear motor. An amplitude controller adjusts the output current or output voltage in a first control cycle so that the amplitude of the movable element is a desired constant value. A resonant controller adjusts the output frequency of the inverter in a second control cycle which is larger than the first control cycle so that the output current of the inverter is substantially minimum on condition that the amplitude is substantially constant.

In the above configuration, the amplitude controller controls the amplitude of the movable element by priority to be nearly constant in a first control cycle and the resonant controller adjusts the output frequency of the inverter so that the current may be minimum macroscopically in a second control cycle. Thus, the frequency corresponding to the smallest current for obtaining the same amplitude is detected, and a resonant control is achieved. At the same time, since the amplitude of the movable element is always controlled to be constant, it is possible to avoid collision of movable element and main body of the motor or large fluctuation of the amplitude of the movable element.

A second driving apparatus according to the present invention is a driving apparatus of a linear motor which reciprocally drives a movable element supported by an elastic member, and includes the following components.

An inverter converts a direct current power into an alternating-current power with a specified frequency to drive the linear motor. A current detector detects the output current of the inverter. A voltage detector detects the output voltage of the inverter. An amplitude detector detects an amplitude of the movable element of the linear motor. An output detector detects an output of the linear motor based on the amplitude of the movable element and the frequency. An output controller adjusts the output current or outputs voltage in a first control cycle so that the output of the motor is a desired constant value. A resonant controller adjusts the output of the motor in a second control cycle which is larger than the first control cycle so that the output current is substantially minimum on condition that the output of the motor is substantially constant.

In this configuration, the output controller controls the output of the motor by priority to be nearly constant in a first control period, and the resonant controller adjusts the output frequency of the inverter so that the current may be minimum macroscopically in a second control period. As a result, the frequency corresponding to the smallest current for obtaining the same output is detected, and the resonant control is realized. At the same time, while the motor output is always controlled to be constant, the amplitude of the movable element does not fluctuate so much in a state of slow or small change of frequency. Hence it is possible to avoid collision of movable element and main body of the motor or large fluctuation of amplitude of the movable element.

In the first or second driving apparatus, the amplitude detector may estimate an induced voltage of the linear motor from the voltage detected by the voltage detector, and detects the amplitude of the movable element from the estimated induced voltage of the linear motor, output frequency of the inverter, and thrust constant of the linear motor.

In the following calculation formula (1) of the induced voltage of the linear motor, if the second and third terms of the right side are sufficiently small as compared with the first time and can be ignored, the induced voltage E can be estimated from the inverter output voltage V. Consequently, as shown in the calculation formula (2) regarding the amplitude, dividing the induced voltage E by the output angular velocity ω (proportional to frequency) and known motor thrust constant BL can provide the piston amplitude r. Thus, the resonant control can be achieved without a displacement sensor. Accordingly, in addition to the effects of the foregoing driving apparatuses, smaller size, lighter weight and lower cost for the apparatus are realized. Besides, the reliability is enhanced for lack of a physical sensor.

$$E = V - R \cdot I - L \cdot dI/dt \quad (1)$$

where E: induced voltage (V), V: inverter output voltage (V), R: winding resistance (ohms), I: current (A), and L: inductance (H).

$$r = E/(BL \cdot \omega) \quad (2)$$

where r: piston amplitude (m), BL: motor thrust constant (N/A), ω: angular velocity (rad/s)=2·π·f, and f: output frequency (Hz).

Further, the amplitude detector may estimate the induced voltage by using the current detected by the current detector and the winding resistance of the linear motor in addition to the voltage detected by the voltage detector.

Hence, in the formula (1) for the induced voltage, when the third term of the right side is sufficiently small as compared with the induced voltage E and can be ignored, the induced voltage E can be calculated from the inverter output voltage V, winding resistance R and current I. Consequently, as shown in the formula (2) for the amplitude, dividing the induced voltage by the output angular velocity ω (proportional to frequency) and known motor thrust constant BL can provide the piston amplitude r. Therefore, the resonance control can be achieved at high precision without a displacement sensor.

Further, the amplitude detector estimates the induced voltage by using the current detected by the current detector, the winding resistance of the linear motor, and the inductance of the linear motor in addition to the voltage detected by the voltage detector.

Hence, in the formula (1) of the induced voltage, the induced voltage E can be calculated accurately from the inverter output voltage V, winding resistance R, current I, and inductance L. Then, as shown in the formula (2) of the amplitude, dividing the induced voltage by the output angular velocity ω (proportional to frequency) and known motor thrust constant BL can provide the piston amplitude r. Therefore, the resonance control can be achieved at higher precision without a displacement sensor.

The current detector and voltage detector may detect the momentary current and voltage at the timing when the change rate of the inverter output current is nearly zero, respectively.

At the timing when the change rate of the current or the differential value of the current is zero, the third term of the right side is zero in the formula (1) of the induced voltage, and the induced voltage E can be calculated accurately from the inverter output voltage V, winding resistance R, and current I. Then, as shown in the formula (2) of the amplitude, dividing the induced voltage by the output angular velocity ω (proportional to frequency) and known motor thrust constant BL can provide the piston amplitude r. Therefore, the resonance can be controlled by a simple calculation without a displacement sensor.

Alternately, the current detector and voltage detector may detect the momentary current and voltage at the timing when the momentary value of the inverter output current is nearly maximum or minimum, respectively.

At the timing of maximum or minimum of the momentary value of current, since the differential value of the sinusoidal current is zero, the third term of the right side is zero in the formula (1) of the induced voltage, and the induced voltage E can be calculated accurately from the inverter output voltage V, winding resistance R, and current I. As shown in the formula (2) of the amplitude, by dividing the induced voltage by the output angular velocity ω (proportional to frequency) and known motor thrust constant BL, the piston amplitude r can be determined. Therefore, the resonance can be controlled without the displacement sensor.

The current detector and voltage detector respectively may detect the momentary current and momentary voltage at the timing when the phase of the inverter output current is nearly 90 or 270 degrees.

At the timing of 90 or 270 degrees of the current phase, since the differential value of the sinusoidal current is zero, the third term of the right side is zero in the formula (1) of the induced voltage, and the induced voltage E can be calculated accurately from the inverter output voltage V, winding resistance R, and current I. As shown in the formula (2) of the amplitude, by dividing the induced voltage by the output angular velocity ω (proportional to frequency) and known motor thrust constant BL, the piston amplitude r can be determined. Therefore, the resonance can be controlled without the displacement sensor.

The upper and lower limits of the output frequency may be defined in the resonant controller.

By preliminarily inspecting the variation range of the resonant frequency in the device and setting the upper and lower limits of the output frequency on the basis of this range, the resonance control can be achieved so that the driving frequency does not deviate from the resonant frequency and the current does not extremely increase as a result of ensuring reasonable amplitude or motor output.

The resonant controller may set a natural resonant frequency of the linear motor in no-load state determined by the spring constant of the elastic member and the mass of the movable element, as a driving frequency upon start. Therefore, by preliminarily inspecting the natural resonant frequency of the linear motor and setting this frequency as a driving frequency used in a nearly no-load state upon start, the resonance control can be achieved so that the driving frequency does not deviate from the resonant frequency and the current does not extremely increase as a result of ensuring reasonable amplitude or motor output.

Otherwise, the resonant controller may set a lower frequency than a natural resonant frequency of the linear motor in no-load state determined by the spring constant of the elastic member and the mass of the movable element, as a driving frequency upon start.

Thus, by preliminarily inspecting the natural resonant frequency of the linear motor and setting a frequency lower than this frequency if the load state is unknown upon start, the resonant control can be started, according to the current characteristic shown in FIG. 8, without extreme increase of current in spite of priority of control of amplitude.

The resonant controller may sets a higher frequency than a natural resonant frequency of the linear motor in no-load state determined by the spring constant of the elastic member and the mass of the movable element, as a driving frequency upon start.

Thus, by preliminarily inspecting the natural resonant frequency of the linear motor and setting a frequency higher than this frequency if the load state is unknown upon start, the resonant control can be started, according to the current characteristic shown in FIG. 9, without extreme increase of current in spite of priority of control of motor output.

The linear motor may be installed in a vehicle which can be oscillated from outside.

When the amplitude of the movable element is extended by oscillation from outside in phase with the driving frequency while the linear motor is being driven, control is done so as to keep the amplitude and motor output constant by decreasing the voltage and current. Thus the resonance control can be achieved in which the external oscillation can also be added to the driving energy, and the energy-saving performance can be improved. If the amplitude of the movable element is damped by the external oscillation in opposite phase to the driving frequency, it is controlled to keep the amplitude and motor output constant by increasing the voltage and current, and in the case of a compressor shortage of refrigerating capacity is avoided. In both cases, since the amplitude and motor output are controlled to be constant, it is possible to avoid collision of movable element and main body of the motor, large fluctuation of amplitude of movable element, or variation of performance of device.

BRIEF DESCRIPTION OF THE INVENTION

PREFERRED EMBODIMENTS OF THE INVENTION

Preferred embodiments of a driving apparatus for a linear compressor of the invention are described specifically below with reference to the accompanying drawings.

First Embodiment

Figure 1:
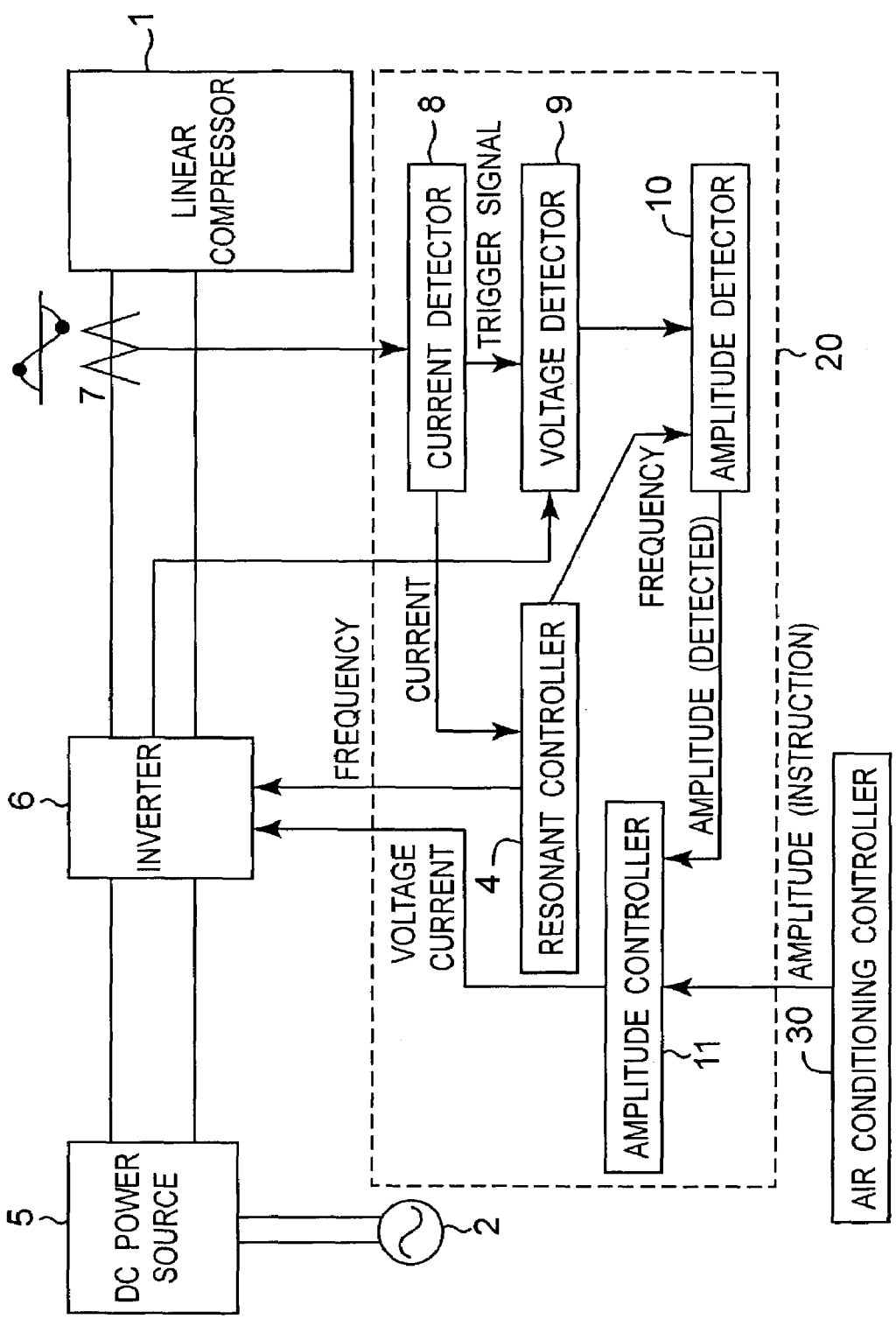
FIG. 1 is a block diagram of a linear motor driving apparatus according to the first embodiment of the present invention.

FIG. 1 is a block diagram showing a configuration of a driving apparatus of a linear compressor in the first embodiment of the invention. As shown in the diagram, the driving apparatus includes a DC power source 5 which generates a DC voltage from an AC power source 2, an inverter 6 which produces a driving voltage for a linear compressor 1, and a controller 20 which controls the inverter 6. The controller 20 contains a resonant controller 4, a current detector 8, a voltage detector 9, an amplitude detector 10, and an amplitude controller 11. The controller 20 receives an amplitude instruction from an air conditioning controller 30 for obtaining a capacity of the linear compressor 1 necessary for realizing a desired air conditioning control.

The DC power source 5 serves as supplying a DC voltage to the inverter 6, and generally includes a commercial AC power source 2, a diode bridge for rectifying the AC power, and a smoothing capacitor.

Figure 13:
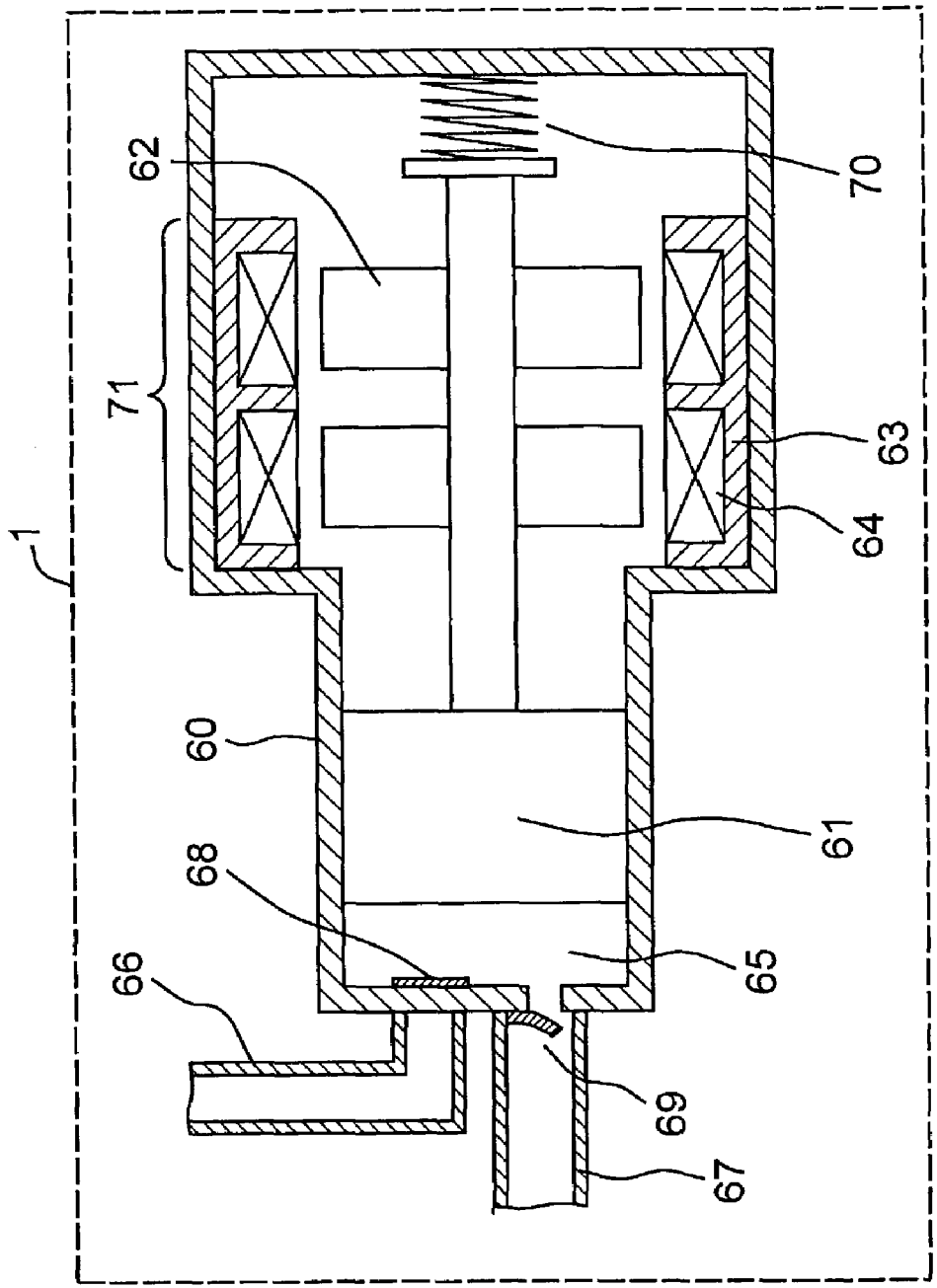
FIG. 13 is a diagram showing an internal structur of the linear compressor.
Figure 14:
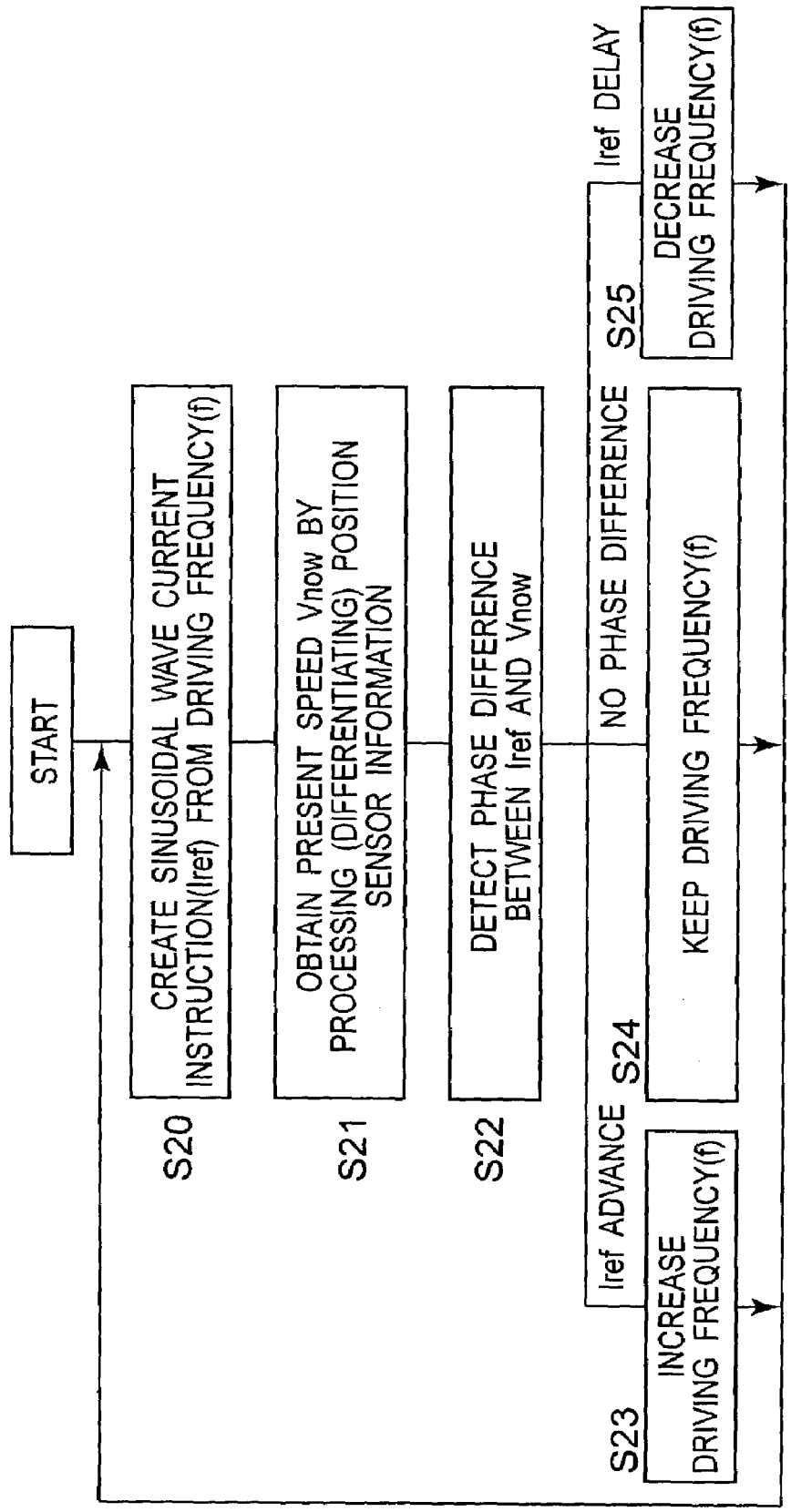
FIG. 14 is a flow chart showing a process of a conventional driving apparatus.

The inverter 6 generates a PWM controlled AC voltage for driving the linear compressor 1 from the DC voltage from the DC power source 5. The linear compressor 1 has a configuration as shown in FIG. 13.

Figure 12:
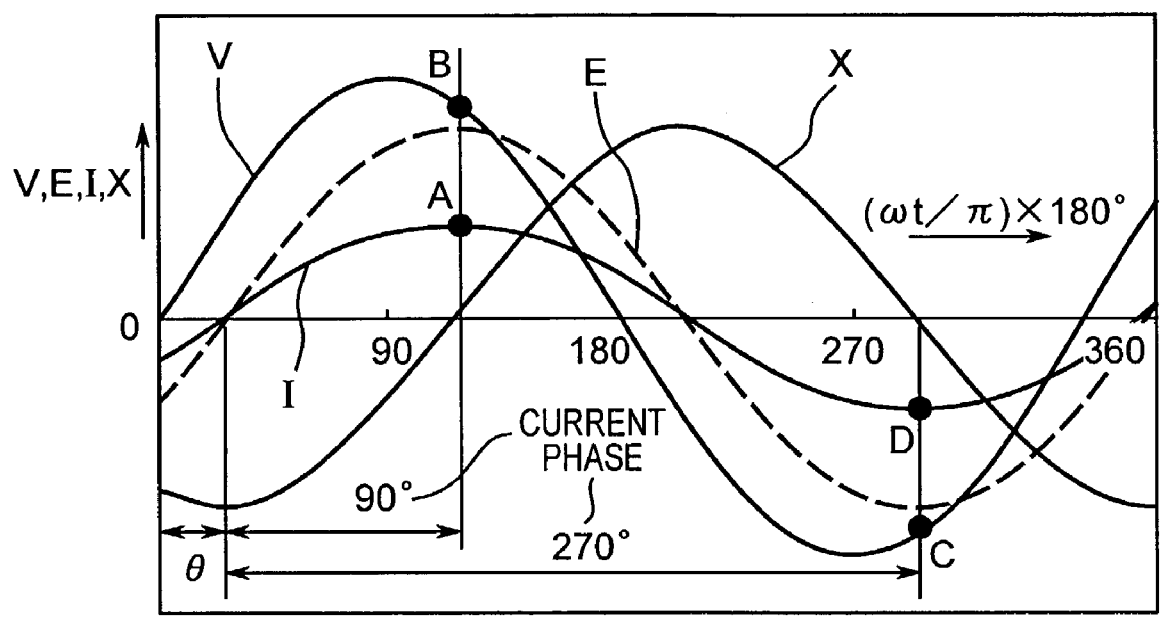
FIG. 12 is a diagram showing phase relations in a resonant state.

The current detector 8, using a current sensor 7, detects the output current of the inverter 6, that is, the current flowing in the linear compressor 1. More specifically, the current detector 8 detects the momentary value in every carrier cycle of the inverter 6, and produces current momentary values at the timing at which the change rate of the current is nearly zero, from these momentary values (for example, values at point A and point D in FIG. 12). The momentary values at the timing of zero of the change rate of the current can be detected from the differential value of momentary values, or the maximum value of momentary values, or values near 90 degrees or 270 degrees of output phase values in the inverter.

The amplitude detector 10 detects the amplitude of a piston (movable element) 61 of the linear compressor 1. Specifically, the amplitude detector 10 detects the voltage applied to the linear compressor 1 from the inverter 6 by way of the voltage detector 9, and the voltage detected herein is a momentary value of the output voltage of the inverter 6 at the same timing as the current detected by the current detector 8 (for example, points B and C in FIG. 12). The detection may be done by either detecting directly an output of the inverter 6, or detecting from a product of the DC voltage value fed into the inverter 6 multiplied by a modulation factor or duty ratio of PWM voltage.

Figure 11:
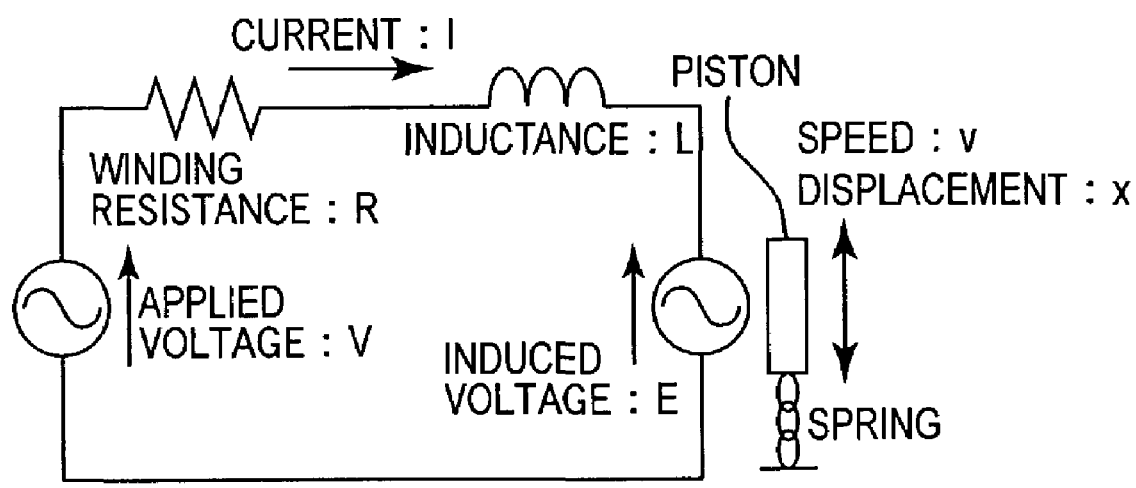
FIG. 11 is a diagram showing an equivalent circuit of a linear compressor driving system.

The amplitude detector 10 first calculates an induced voltage E of a linear motor 71 according to a formula (3) from the output voltage of the inverter 6, the current of the inverter 6, and a known winding resistance. The formula (3) is deduced by setting up a voltage formula (1) from an equivalent circuit of a driving system of a linear compressor shown in FIG. 11 and then nullifying its third term, that is, by rendering the change rate of the current to zero.

$$E = V - R \cdot I \quad (3)$$

E: induced voltage (V), V: inverter output voltage (V), R: winding resistance (ohms), I: current (A).

Next, the piston amplitude r is determined from the induced voltage E, frequency f, and known motor thrust constant BL by using a formula (4). The formula (4) is deduced by solving a formula (5) expressing the relation of the speed, amplitude and angular velocity in single vibratory motion with respect to the amplitude.

$$r = E/(BL \cdot 2 \cdot \pi \cdot f) \quad (4)$$

r: piston amplitude (m), BL: motor thrust constant (N/A), f: output frequency (Hz).

$$v = r \cdot \omega \quad (5)$$

v: speed (m/s), r: amplitude (m), ω: angular velocity (rad/s).

In this example, these formulas are used in order to detect the piston amplitude r accurately in the unit of meters. However if it is enough to know only a relative amplitude, only the value of the induced voltage divided by the frequency or angular velocity may be detected, or it may be multiplied by a proportion constant K to obtain an amplitude.

The amplitude controller 11 compares the amplitude instruction value corresponding to the desired capacity commanded from the air conditioning controller 30 with the actual amplitude detected by the amplitude detector 10, and increases or decreases the voltage or current of the inverter output so that their difference may be smaller. The control cycle for increasing or decreasing the voltage or current is preferred to be set in a relatively short period of several mili seconds to hundreds of mili seconds in order to control the amplitude at high response.

Figure 2:
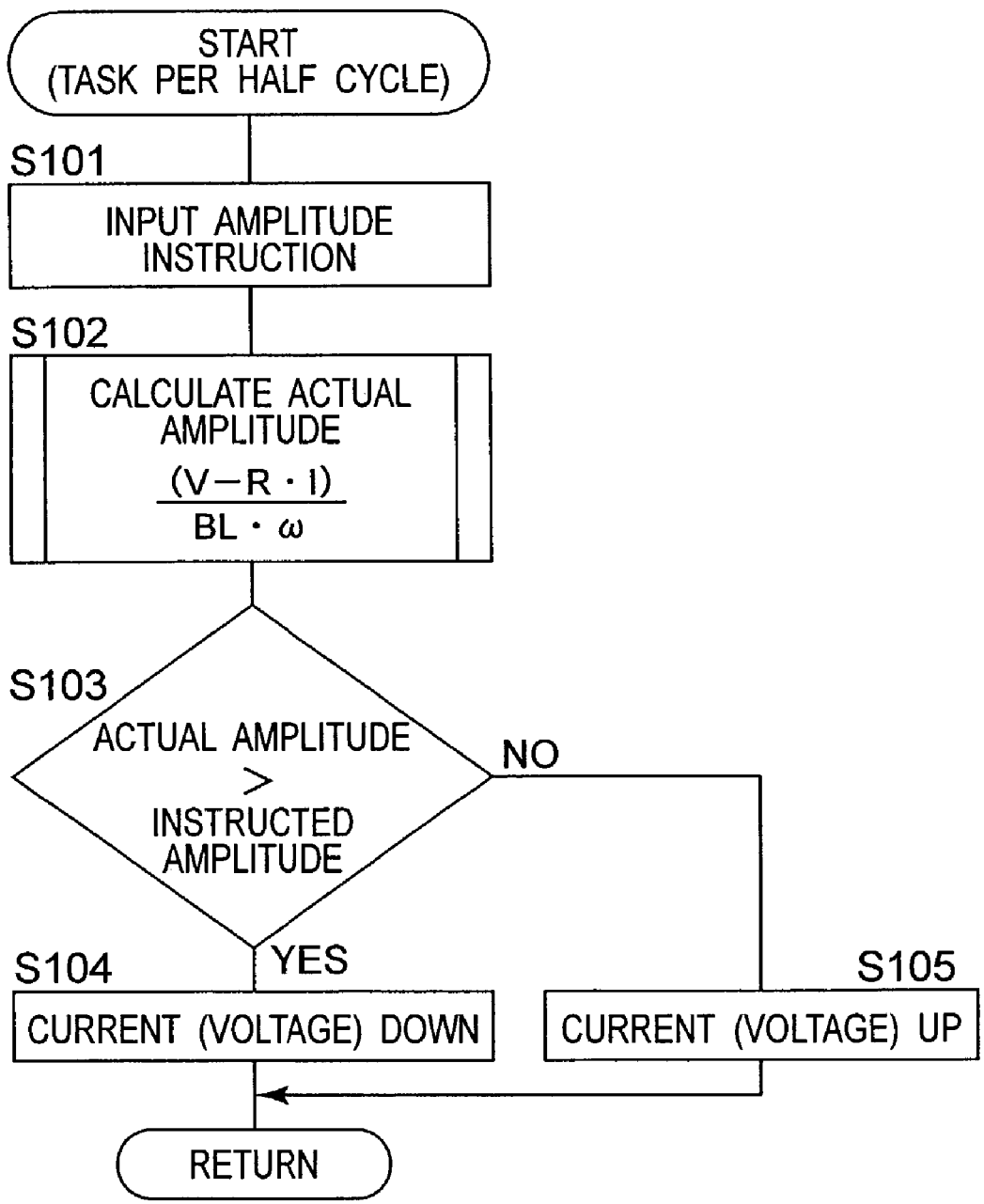
FIG. 2 is a flowchart of an amplitude controller according to the present invention.

FIG. 2 is a flowchart of the amplitude control in the amplitude controller 11 and amplitude detector 10, showing a task (process) of every half period (about 8 ms in the case of 60 Hz) of driving frequency of the linear compressor 1.

First, an amplitude instruction value (instructed amplitude) is entered from the air conditioning controller 30 (step S101). The actual amplitude r is calculated (step S102). The actual amplitude is compared with the instructed amplitude (step S103). When the actual amplitude is larger than the instructed amplitude, the current and voltage of the inverter output are lowered (step S104), and the current and voltage are raised if insufficient (step S105).

By thus controlling, the actual amplitude can be controlled almost constant about the instruction value.

In the driving apparatus of the embodiment, first the amplitude is controlled as describe above, and further the output frequency of the inverter 6 is adjusted by the resonant controller 4 so that the current may be minimum macroscopically. Next, the control of the output frequency is explained below.

The resonant controller 4 accumulates peak values of a current (current momentary value with zero change rate) provided from the current detector 8 for a relatively long control cycle (for example, 1 second), and detects the average of current values, and adjusts the frequency of the inverter output voltage, that is, the driving frequency with the control cycle on the basis of the detected value (such a control is called "resonant control").

Figure 3:
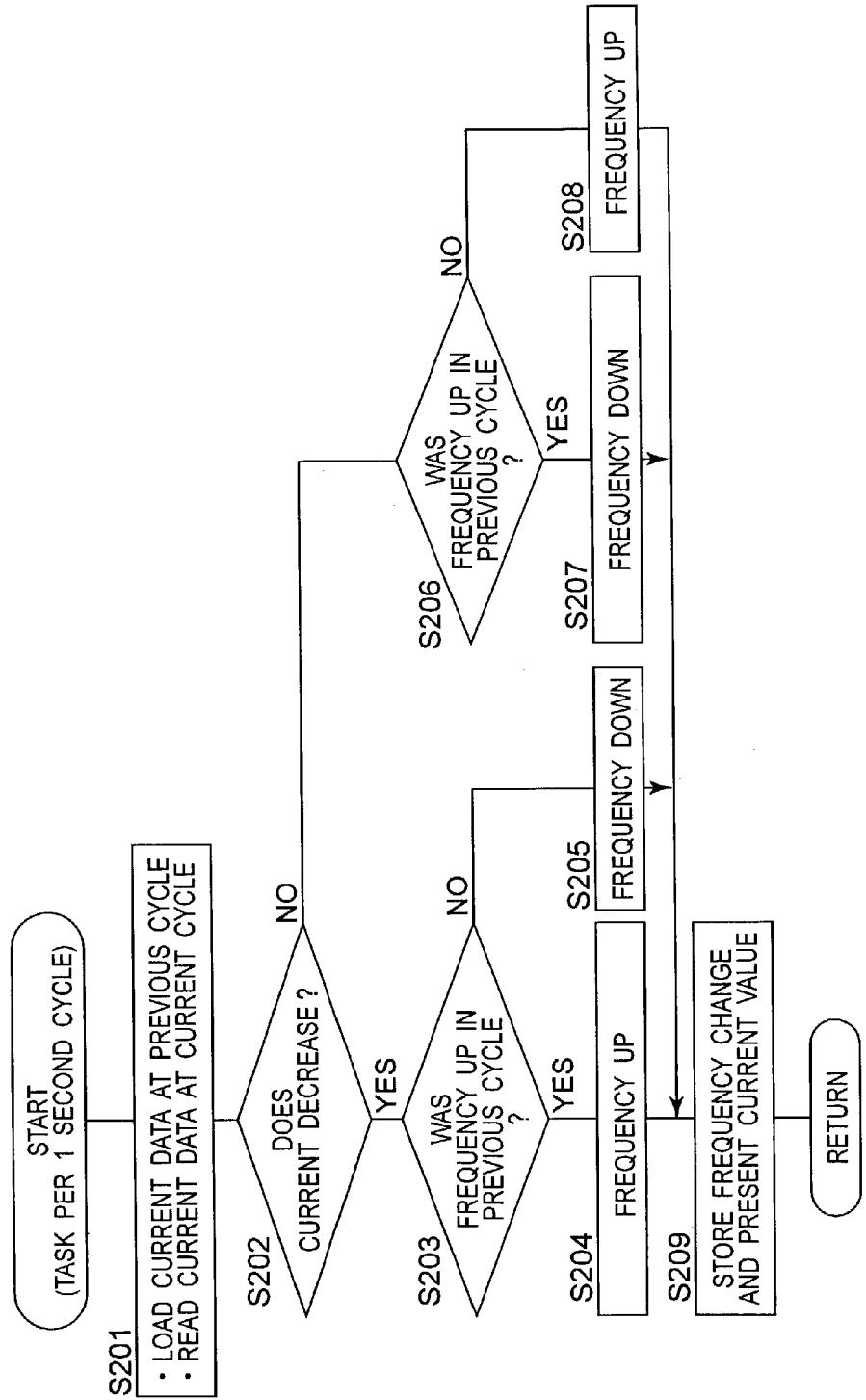
FIG. 3 is a flowchart of a resonant controller according to the present invention.

FIG. 3 is a flowchart of resonant control by the resonant controller 4. This control is a task of every one second. That is, the resonant control is executed in a larger period than the control period in the amplitude control.

As shown in FIG. 3, first, the cumulative average current of the previous cycle (for one second, from two seconds before to one second before) is loaded, and the cumulative average current of the present cycle (for one second, from one second before to the present time) is entered (step S201). It is judged if the current is decreasing or not (Step S202).

When the current is decreasing and the driving frequency is increased (up) in the previous process, the increase is continued (steps S203 and S204). When the current is decreasing direction and the driving frequency is decreased (down) in the previous process, the decrease is continued (steps S203 and S205).

To the contrary, when the current is increasing and the driving frequency is increased (up) in the previous process, the driving frequency is operated in the reverse direction (down) of the previous time (steps S206 and S207). When the current is increasing and the driving frequency is decreased (down) in the previous process, the driving frequency is increased (up) (steps S206 and S208).

Finally, the present operating direction ("up" or "down") of frequency and cumulative average current are stored (step S209).

Figure 8:
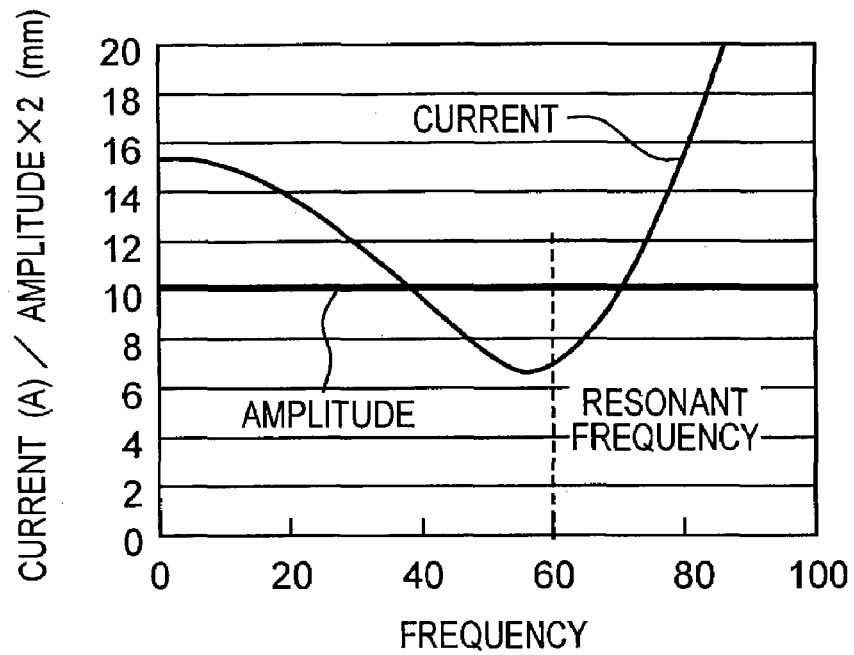
FIG. 8 is a diagram of an inverter output current characteristic to a driving frequency on condition that an amplitude of the linear compressor is constant.
Figure 10:
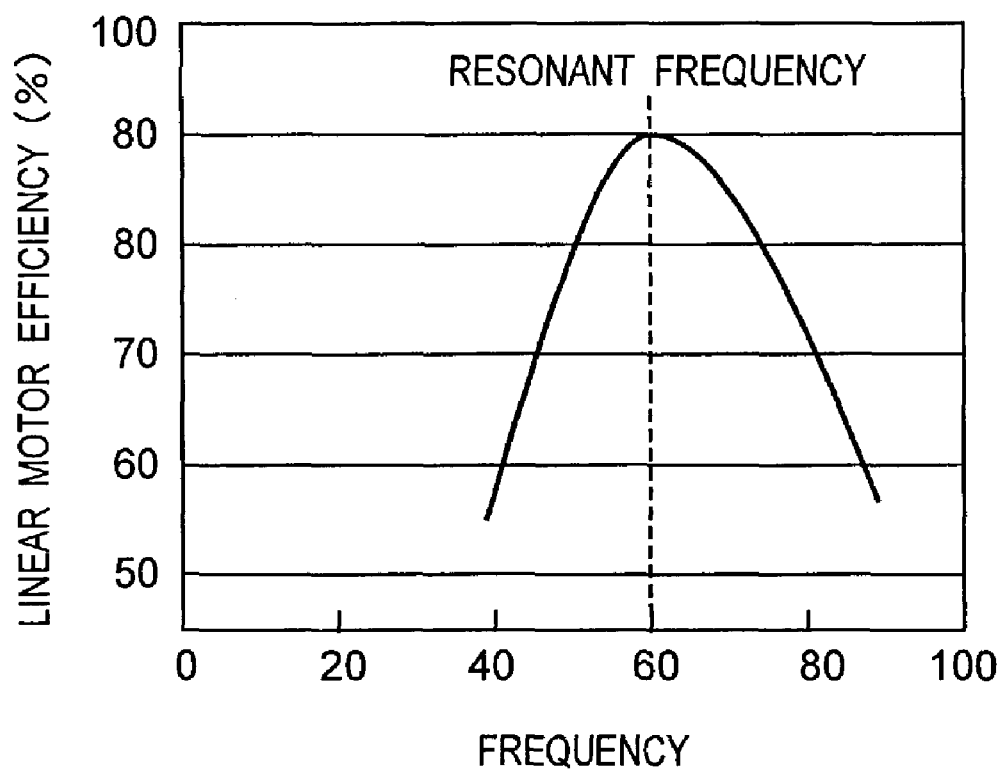
FIG. 10 is a diagram showing an efficiency characteristic to a driving frequency of the linear motor.

By controlling the driving frequency by such a resonant control, the driving frequency can be controlled nearly to the resonant frequency according to the current characteristic with the constant amplitude condition as shown in FIG. 8. In FIG. 8, the frequency of minimum current is slightly lower than the resonant frequency. However, since the deviation is only trifling, there is no practical effect on the efficiency of the linear compressor motor. For reference, the efficiency characteristic on the driving frequency of the linear motor is shown in FIG. 10.

Figure 4:
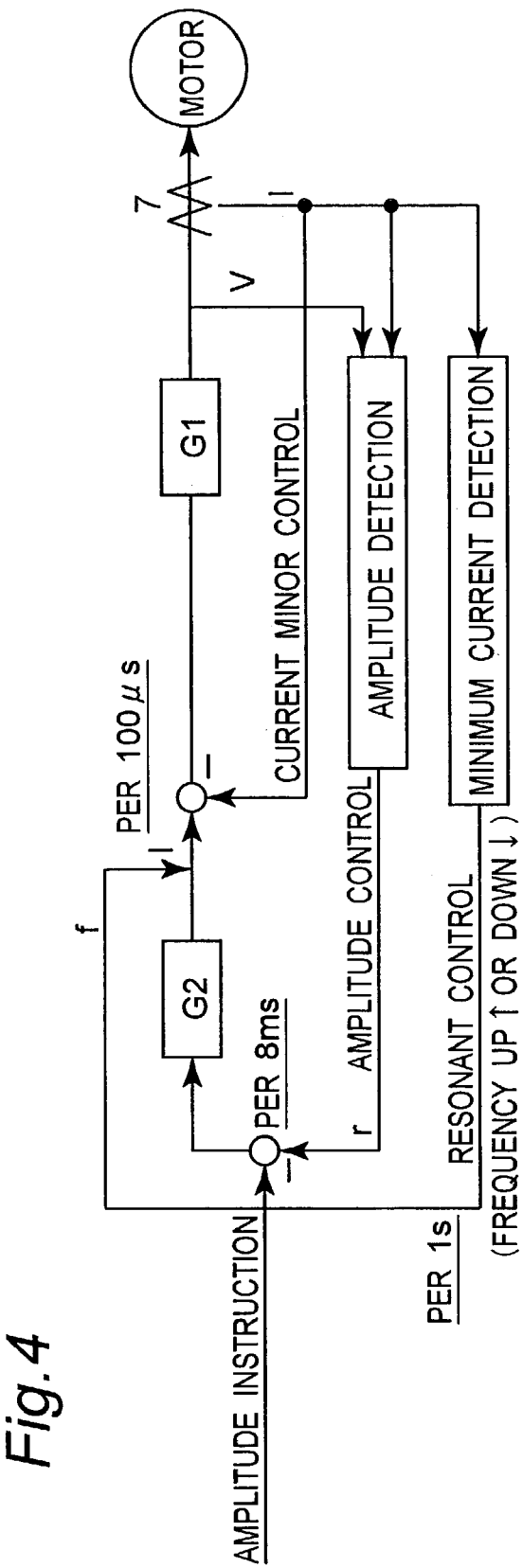
FIG. 4 is a control block of the driving apparatus in the first embodiment of the invention.

FIG. 4 is a block diagram showing an entire control of the driving apparatus of the linear compressor in the first embodiment.

In a current minor control loop, the motor current is detected by the sensor 7 in every carrier period (100 μs) of the inverter 6, and the current waveform is transformed to be sinusoidal and the current amplitude is controlled. Specifically, table data for the sinusoidal current data is multiplied by the PWM modulation factor, and its difference from the actual momentary value is determined, and a voltage proportional to the difference is applied to the motor. Since the control gain G1 (current minor control gain) determines the stability of the current waveform, it may be set to an experimentally determined value so that the hunting may be small and that the response may not be insufficient.

In an amplitude control loop, a point at which the current change rate becomes zero occurs once in half cycle, and the control is done in every half cycle of the driving frequency (about every 8 ms for 60 Hz). The amplitude is calculated from the current and voltage at the timing of zero current change rate, and the current is increased or decreased depending on the difference of the amplitude and command amplitude. Since the control gain G2 (amplitude, output control gain) determines the control stability of the amplitude, it may be set to an experimentally determined value so that the hunting may be small and that the response may not be insufficient.

In a resonant control loop, the driving frequency is adjusted so that the current may be minimum in a control cycle for one second as explained in FIG. 3. What should be noted in adjustment of this driving frequency is that the current increases suddenly when the driving frequency is largely deviated from the resonant frequency as shown in FIG. 8. To prevent this inconvenience, the upper limit and lower limit of the output frequency may be set. The setting values are determined from the current capacity of the inverter 6 and the maximum value of the control amplitude.

In the case of this control, in particular, it must be noted that the driving frequency is deviated largely from the resonant frequency to the higher direction. When no load is applied such as upon start of the compressor, the natural resonant frequency may be applied. Or if the load is not known upon start, it is safe to apply a frequency slightly lower than the natural resonant frequency. Besides, the load of the air conditioning system may be estimated from the compressor temperature or residual discharge or suction pressure, and by determining the starting frequency, unstable state upon start can be avoided.

The natural resonant frequency of the linear compressor can be calculated in $\sqrt{(k/m)}$, where k is machine spring constant (m/N) and m is piston mass (kg). The resonant frequency at a certain standard load may be calculated as $\sqrt{\{(k+K)/m\}}$ assuming the gas spring constant by compressed gas to be K, where K is the gas spring constant (m/N).

Both the amplitude control loop and resonant control loop operate the current, and it seems to be contradictory. However the current can converge by providing a sufficient difference in the control cycle. It has been confirmed by experiments.

As described herein, according to the embodiment, while controlling the amplitude of the piston to be constant at high response, the driving frequency is controlled to be equal to the resonant frequency so that the inverter output current may be minimum. This control can prevent collision of piston and cylinder in the adjustment process of the resonant frequency. Further, when vibration is applied from outside, the amplitude is automatically controlled so that the current is minimum. This allows the externally added energy to be utilized in compressing operation and prevents the performance of the apparatus from fluctuating.

Further, without using the displacement sensor for detecting the piston displacement physically, the amplitude is detected from the inverter output voltage, inverter current, and motor constant. Thus, the size, weight and cost of the apparatus can be reduced and the reliability can be enhanced.

Second Embodiment

Figure 5:
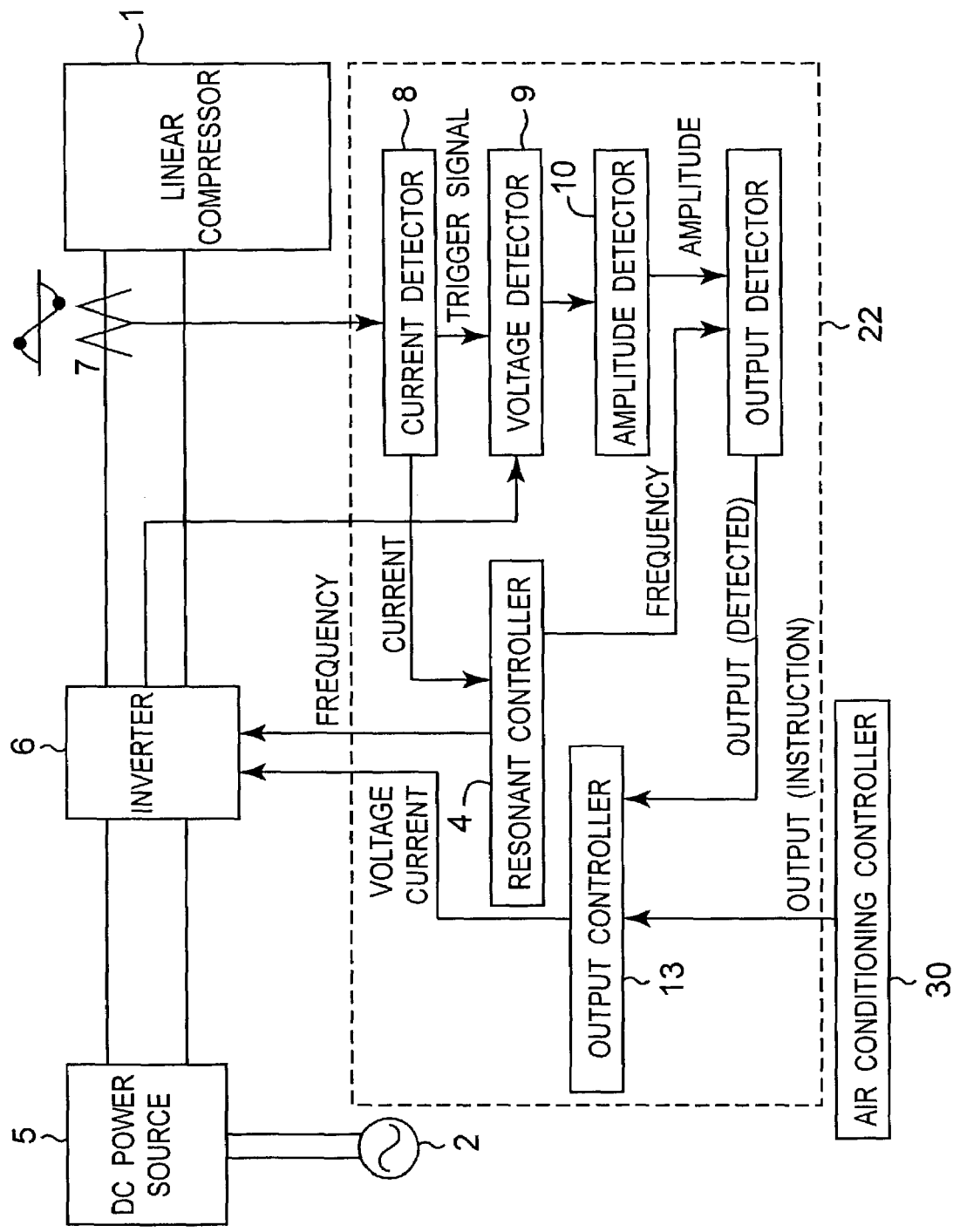
FIG. 5 is a block diagram of a linear motor driving apparatus according to the second embodiment of the invention.

FIG. 5 is a block diagram showing a configuration of a driving apparatus of a linear compressor according to the second embodiment of the invention. As shown in the figure, the driving apparatus includes a DC power source 5 for generating a DC voltage from an AC power source 2, an inverter 6 for producing a driving voltage for a linear compressor 1, and a controller 22 for controlling the inverter 6. The controller 22 contains a resonant controller 4, a current detector 8, a voltage detector 9, an amplitude detector 10, an output controller 12, and an output controller 13.

The current detector 8, voltage detector 9, and amplitude detector 10 are the same as in the first embodiment.

The output detector 12 detects the output of the linear motor of the linear compressor 1. Specifically, the motor output is calculated in formula (6) from the amplitude detected by the amplitude detector 10, the driving frequency, and piston mass which is know in advance.

$$P=(½)·m·r^2·\omega^3 \qquad (6)$$

where P: motor output (W), m: piston mass (kg), ω: angular velocity (rad/s), r: amplitude (m).

It should be noted that Formula (6) may be deduced by modifying Formula (7) which expresses the motor output with a work factor.

$$P=F·V \qquad (7)$$

where F: force acting on the piston (N: effective value), v: piston speed (m/s: effective value).

When calculating the output by microcomputer according to formula (6), calculation of square or cube is required. Therefore, for a simple calculation, the product by multiplying the driving frequency with the amplitude may be controlled to be constant in the output controller 13 mentioned below. It however needs to pay attention when the variation width of the frequency is larger.

The output controller 13 compares a motor output instruction value corresponding to the desired performance from the air conditioning controller 30 with the actual output detected by the output detector 12, and increases or decreases the voltage or current (voltage or current of inverter output) applied to the linear compressor 1 so that the difference between the output instruction and the actual output is smaller. The control cycle for increasing or decreasing the voltage or current is set at a relatively short period of about several mili seconds to hundreds of mili seconds in order to control the amplitude at high response.

Figure 6:
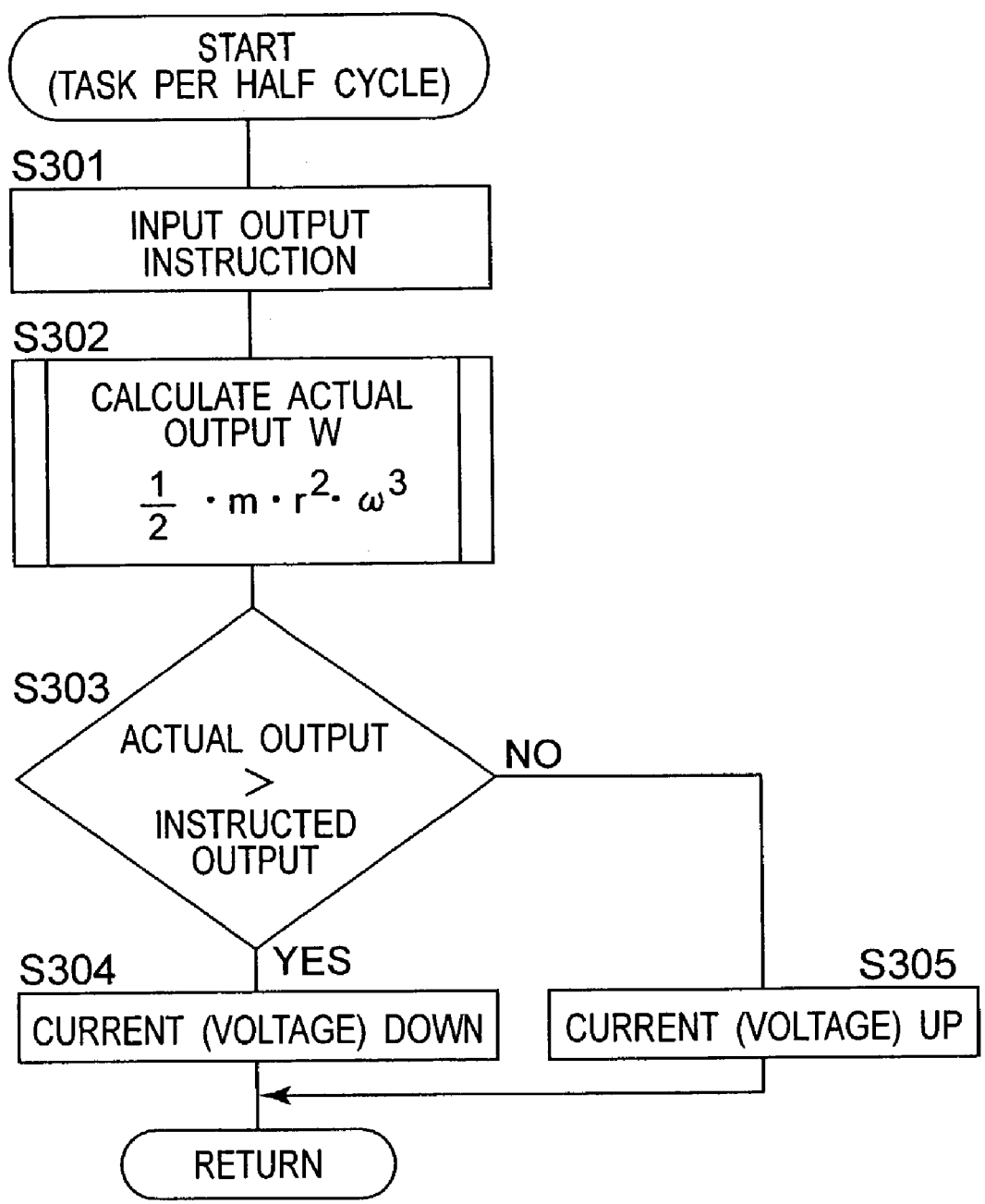
FIG. 6 is a flowchart of an output controller.

FIG. 6 is a flowchart of the above described control in the output controller 13 and output detector 12. This control is a task of every half cycle (about 8 ms for 60 Hz) of the driving frequency.

First, an output instruction value (instructed output) from the air conditioning controller 30 is entered (step S201), and an actual output W is calculated (step S302). The actual output is compared with instructed output (step S303). When the actual output is beyond the instructed output, the output current and voltage are reduced (step S304), or when the actual output is insufficient, the output current and voltage are increased (step S305).

By thus controlling, the actual output can be controlled almost constant about the instruction value.

Together with this output controlled, in this embodiment, too, the resonant control is performed by the resonant controller 4 same as in the first embodiment (FIG. 3). The driving frequency is adjusted so that the current may be minimum macroscopically. The resonance control is performed in a longer control cycle than that of the output control.

Figure 9:
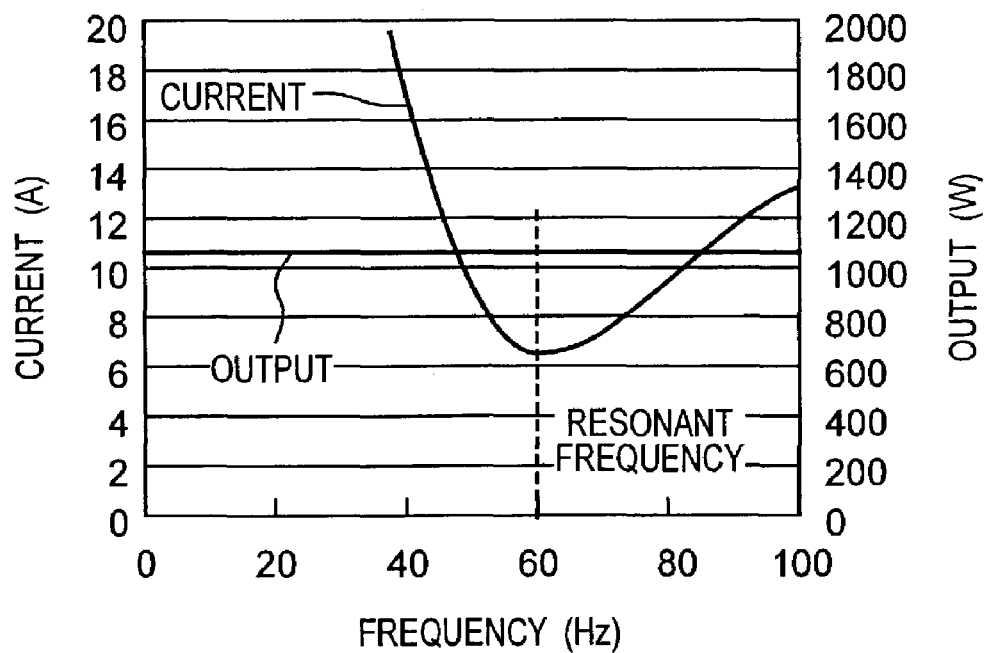
FIG. 9 is a diagram of an inverter output current characteristic to a driving frequency on condition that an output of the linear compressor is constant.

By thus controlling the driving frequency, the driving frequency is controlled to be resonant frequency according to the current characteristic in the output constant condition shown in FIG. 9. At this time, the frequency providing the minimum current under the constant output condition coincides with the resonant frequency as shown in FIG. 9.

Figure 7:
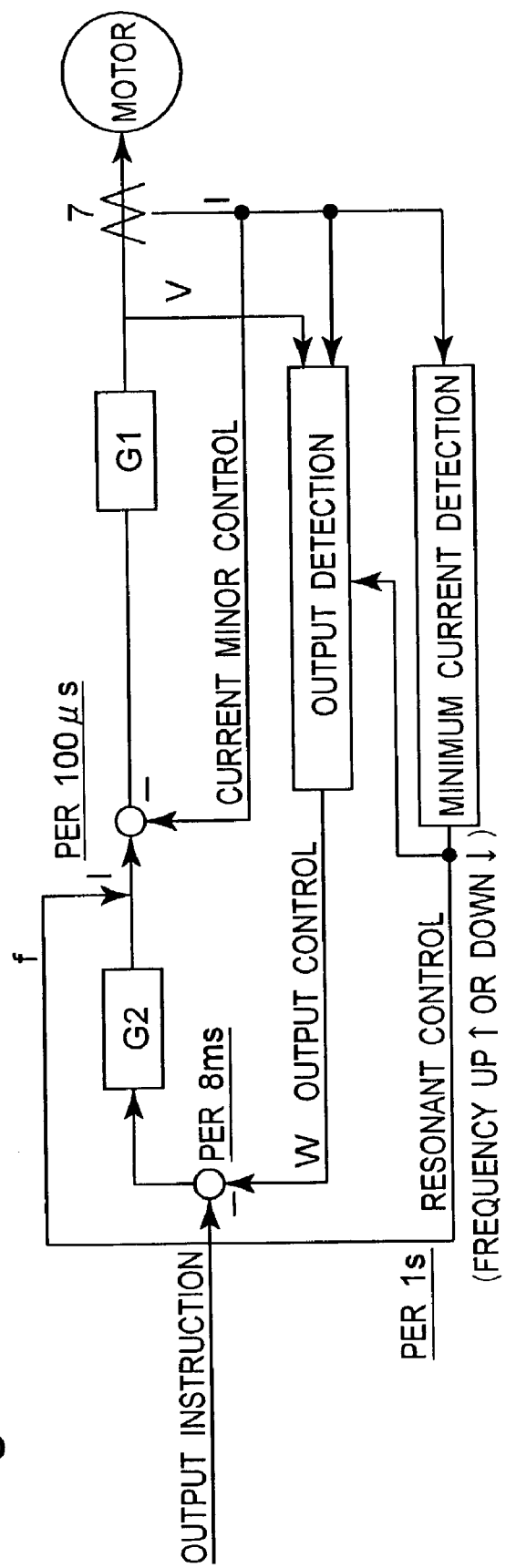
FIG. 7 is a control block diagram of the driving apparatus in the second embodiment of the invention.

FIG. 7 is a block diagram showing an entire control of the driving apparatus in this embodiment.

In an output control loop, same as in the first embodiment, zero point of current change rate occurs once in half cycle, and the control cycle is half (about every 8 ms for 60 Hz) of the cycle corresponding to the driving frequency. A motor output is calculated from the current and voltage at the timing of zero current change rate, and the driving frequency fed back from the resonant control loop. The output current is increased or decreased depending on the difference of the motor output and instructed value. Since determining the control stability of the motor output, the control gain G2 may be set to an experimentally determined value so that the hunting may be small and that the response may not be insufficient.

In a resonant control loop, the frequency is adjusted so that the current may be minimum in one second of control cycle as explained in connection with FIG. 3. What should be noted in the adjustment of the frequency is that the current increases suddenly when the driving frequency is largely deviated from the resonant frequency as shown in the current characteristic in FIG. 9. To prevent this inconvenience, the upper and lower limits of the output frequency may be set. These values can be determined from the current capacity of the inverter circuit and the maximum value of the controlled amplitude.

In the case of this control, in particular, it must be noted that the driving frequency is deviated largely from the resonant frequency to the lower direction. When no load is applied, for example, upon start of the compressor, the natural resonant frequency may be applied. When the load is not known upon start, it is safe to apply a frequency slightly higher than the natural resonant frequency. Further, the starting frequency is determined by estimating the load of the air conditioning system from the compressor temperature or residual discharge or suction pressure. Thus unstable state upon start can be avoided.

Both the amplitude control loop and resonant control loop operate the current, and it seems to be contradictory. However the current can converge by providing a sufficient difference in the control cycle. It has been confirmed by experiments.

As described herein, according to the embodiment, while controlling the motor output to be constant at high response, the amplitude of the piston is controlled almost constant and the driving frequency is controlled to be equal to the resonant frequency, when the frequency change is late and small. Therefore collision of piston and cylinder can be prevented in the adjustment process of the resonant frequency. This allows the externally added energy to be utilized in compressing operation and prevents the performance of the apparatus from fluctuating.

Further, without using the displacement sensor for detecting the piston displacement physically, the motor output is detected from the inverter output voltage, inverter output current, and motor constant. Thus, the size, weight and cost of the apparatus can be reduced and the reliability can be enhanced.

Variations in Embodiments

In the first and second embodiments, the linear compressor 1 may be installed in a vehicle oscillated from outside. If the amplitude of the movable element is enhanced by the external oscillation in phase with the driving frequency while the linear motor in the linear compressor 1 is being driven, the control is done so that the amplitude and motor output are kept constant by decreasing the voltage and current, and thus the resonant control can be achieved so that the external oscillation power can also be utilized as driving energy. If the amplitude of the movable element is damped due to the external oscillation in opposite phase to the driving frequency, it is controlled to keep the amplitude and motor output constant by increasing the voltage and current. Thus, in the case of a compressor, shortage of refrigerating capacity is avoided. Since in both cases the amplitude and motor output are controlled to be constant, it is possible to avoid collision of movable element and the main body of the motor, large fluctuation of amplitude of movable element, or variation of performance of the apparatus.

According to the driving apparatus of the linear motor of the invention, the amplitude of the movable element or the motor output is controlled by priority to be substantially constant in a first control cycle, and the resonant controller adjusts the output frequency of the inverter in a second control cycle so that the current may be minimum macroscopically. As a result, the frequency providing the smallest current for obtaining the same amplitude is detected, and the resonant control at high efficiency is achieved. Further, the amplitude of the movable element or the motor output is always controlled constant. Therefore, it is possible to avoid collision of movable element and main body of the motor in the resonant control process, or to prevent performance fluctuation of the device, and thus the reliability and comfort may be enhanced.

Although the present invention has been described in connection with specified embodiments thereof, many other modifications, corrections and applications are apparent to those skilled in the art. Therefore, the present invention is not limited by the disclosure provided herein but limited only to the scope of the appended claims.

The present disclosure relates to subject matter contained in Japanese Patent Application No. 2002-146391, filed on May 21, 2002, which is expressly incorporated herein by reference in its entirety.

What is claimed is:

1. A driving apparatus of a linear motor which reciprocally drives a movable element supported by an elastic member, comprising:
an inverter operable to convert a direct current power into an alternating-current power with a specified frequency to drive the linear motor;
a current detector operable to detect the output current of the inverter;
a voltage detector operable to detect the output voltage of the inverter;
an amplitude detector operable to detect an amplitude of the movable element of the linear motor;
an amplitude controller operable to adjust the output current or output voltage in a first control cycle so that the amplitude of the movable element is a desired constant value; and
a resonant controller operable to adjust the output frequency of the inverter in a second control cycle which is larger than the first control cycle so that the output current of the inverter is substantially minimum on condition that the amplitude is substantially constant.

2. The apparatus according to claim 1, wherein the amplitude detector estimates an induced voltage of the linear motor from the voltage detected by the voltage detector, and detects the amplitude of the movable element from the estimated induced voltage of the linear motor, output frequency of the inverter, and thrust constant of the linear motor.

3. The apparatus according to claim 2, wherein the amplitude detector uses, in addition to the voltage detected by the voltage detector, the current detected by the current detector and winding resistance of the linear motor to estimate the induced voltage.

4. The apparatus according to claim 2, wherein the amplitude detector uses, in addition to the voltage detected by the voltage detector, the current detected by the current detector, winding resistance of the linear motor, and inductance of the linear motor to estimate the induced voltage.

5. The apparatus according to claim 2, wherein the current detector and voltage detector detect the momentary current and momentary voltage at the timing when the change rate of the inverter output current is substantially zero, respectively.

6. The apparatus according to claim 2, wherein the current detector and voltage detector detect the momentary current and momentary voltage at the timing when the momentary value of the inverter output current is substantially maximum or minimum, respectively.

7. The apparatus according to claim 2, wherein the current detector and voltage detector detect the momentary current and momentary voltage at the timing when the phase of the inverter output current is nearly 90 or 270 degree, respectively.

8. The apparatus according to claim 1, wherein the resonant controller has upper and lower limits of the output frequency.

9. The apparatus according to claim 1, wherein the resonant controller sets a natural resonant frequency of the linear motor in no load state which is determined based on a spring constant of the elastic member and mass of the movable element, as an output frequency upon start.

10. The apparatus according to claim 1, wherein the resonant controller sets a lower frequency than a natural resonant frequency of the linear motor in no load state which is determined based on a spring constant of the elastic member and mass of the movable element, as an output frequency upon start.

11. The apparatus according to claim 1, wherein the linear motor is mounted on a vehicle.

12. A driving apparatus of a linear motor which reciprocally drives a movable element supported by an elastic member, comprising:
an inverter operable to convert a direct current power into an alternating-current power with a specified frequency to drive the linear motor;
a current detector operable to detect the output current of the inverter;
a voltage detector operable to detect the output voltage of the inverter;
an amplitude detector operable to detect an amplitude of the movable element of the linear motor;
an output detector operable to detect an output of the linear motor based on the amplitude of the movable element and the frequency;
an output controller operable to adjust the output current or output voltage in a first control cycle so that the output of the motor is a desired constant value; and
a resonant controller operable to adjust the output of the motor in a second control cycle which is larger than the first control cycle so that the output current is substantially minimum on condition that the output of the motor is substantially constant.

13. The apparatus according to claim 12, wherein the amplitude detector estimates an induced voltage of the linear motor from the voltage detected by the voltage detector, and detects the amplitude of the movable element from the estimated induced voltage of the linear motor, output frequency of the inverter, and thrust constant of the linear motor.

14. The apparatus according to claim 13, wherein the amplitude detector uses, in addition to the voltage detected by the voltage detector, the current detected by the current detector and winding resistance of the linear motor to estimate the induced voltage.

15. The apparatus according to claim 13, wherein the amplitude detector uses, in addition to the voltage detected by the voltage detector, the current detected by the current detector, winding resistance of the linear motor, and inductance of the linear motor to estimate the induced voltage.

16. The apparatus according to claim 13, wherein the current detector and voltage detector detect the momentary current and momentary voltage at the timing when the change rate of the inverter output current is substantially zero, respectively.

17. The apparatus according to claim 13, wherein the current detector and voltage detector detect the momentary current and momentary voltage at the timing when the momentary value of the inverter output current is substantially maximum or minimum, respectively.

18. The apparatus according to claim 13, wherein the current detector and voltage detector detect the momentary current and momentary voltage at the timing when the phase of the inverter output current is nearly 90 or 270 degree, respectively.

19. The apparatus according to claim 12, wherein the resonant controller has upper and lower limits of the output frequency.

20. The apparatus according to claim 12, wherein the resonant controller sets a natural resonant frequency of the linear motor in no load state which is determined based on a spring constant of the elastic member and mass of the movable element, as an output frequency upon start.

21. The apparatus according to claim 12, wherein the resonant controller sets a higher frequency than a natural resonant frequency of the linear motor in no load state which is determined based on a spring constant of the elastic member and mass of the movable element, as an output frequency upon start.

22. The apparatus according to claim 12, wherein the linear motor is mounted on a vehicle.

* * * * *